March 31, 1931. E. D. CAMPEN 1,798,834
SHOOK FEEDING MACHINE
Filed May 15, 1929
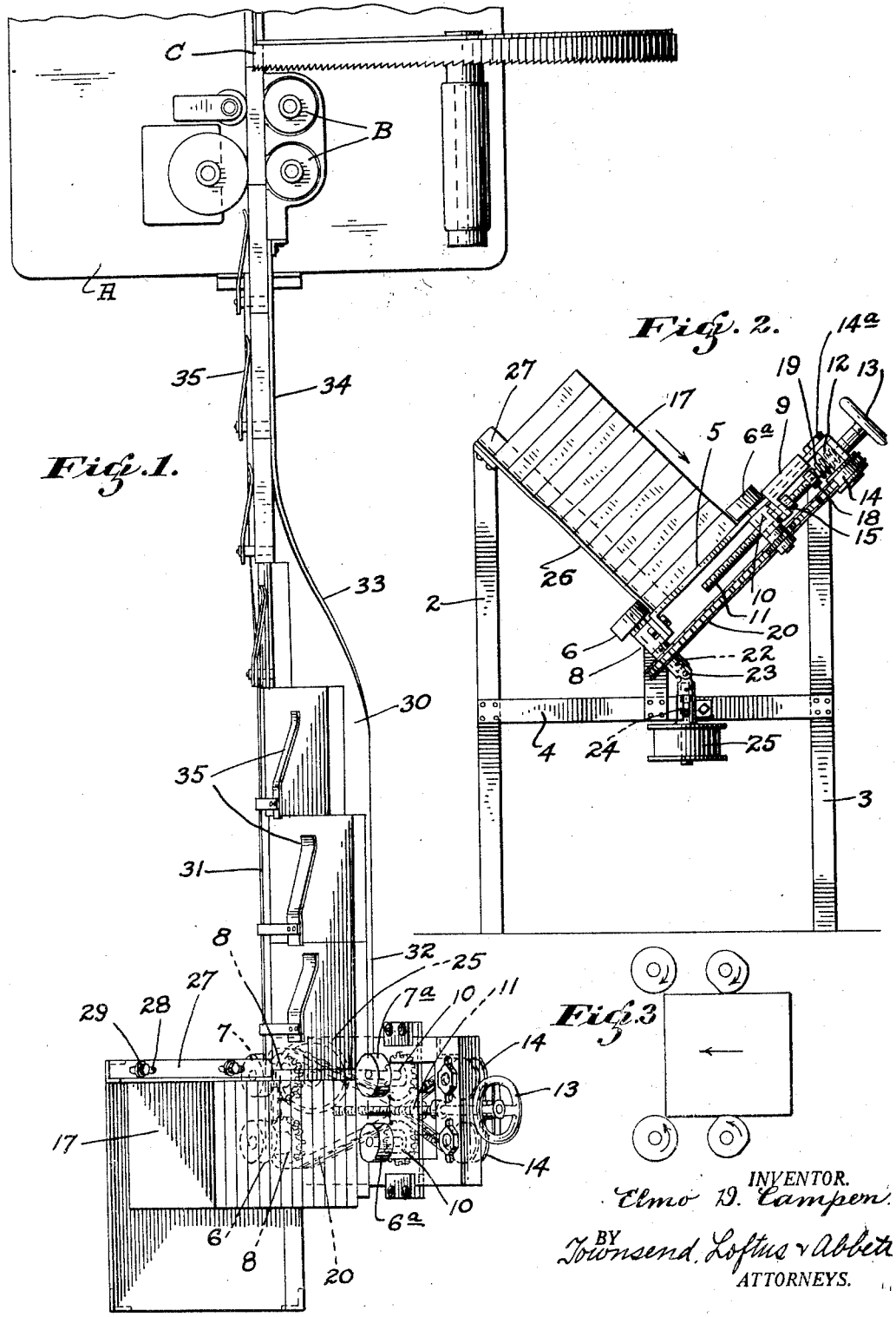

Patented Mar. 31, 1931

1,798,834

UNITED STATES PATENT OFFICE

ELMO D. CAMPEN, OF SAN FRANCISCO, CALIFORNIA

SHOOK-FEEDING MACHINE

Application filed May 15, 1929. Serial No. 363,361.

This invention relates to a machine whereby boards and the like may be automatically fed to a saw, and especially to a machine whereby box shooks may be fed to a vertical resaw.

The object of the present invention is to generally improve and simplify the construction and operation of shook feeding machines; to provide a machine capable of handling shooks or boards of varying length; to provide a machine which is adjustable to handle shooks of varying thickness and width; to provide a machine having a feeding table and a hopper into which a considerable number of shooks or boards may be stacked, one on top of the other; to provide feeding rolls whereby the shook is automatically removed from the hopper one by one; and further to provide a feeding trough through which the shook is fed, and whereby the shook is delivered in an upright position to the feeding rolls of a vertical resaw.

The shook feeding mechanism is shown by way of illustration in the accompanying drawings, in which:

Fig. 1 is a plan view of the shook feeding machine,

Fig. 2 is an end view of the same,

Fig. 3 is a diagrammatic view showing method and position of the feeding rolls.

Referring to the drawings in detail, especially Fig. 1, A indicates the table of a resaw, B the vertical feeding rolls between which the lumber or shook is fed and C the saw. The type of saw employed is usually a band saw. The saw and its mechanism forms no part of the present invention, but it is merely illustrated to show the manner in which the shook feeder is operated and connected therewith.

The shook feeder consists of a frame, consisting of uprights 2 and 3, and cross braces 4. Suitably secured in the frame is a feeding table 5. This table is disposed on an angle of approximately 45° and it forms a support for two pairs of feeding rolls, generally indicated at 6 and 6a, and 7 and 7a. The rollers 6 and 7 are secured on shafts which are mounted in journal members 8 secured to the lower edge of the table. The upper edge of the table is provided with a crosshead 9, and this carries journal members 10 which support the rollers 6a and 7a. The cross head together with the feeding rolls carried thereby is adjustable to take care of shooks of varying width. This adjustment is obtained by providing a screw rod 11. The rod is journalled in a bearing 12, and is provided with a hand wheel 13 whereby it may be rotated. The bearing also supports a pair of idler wheels 14, the function of which will hereinafter be described. The lower end of the rod is threaded, as shown, and it extends through a nut 15 secured to the crosshead 9. Hence, by rotating the rod the crosshead, together with the feeding rolls carried thereby is moved to or away from the stack of shooks indicated at 17, and shooks of varying width may thus be taken care of.

A collar 18 is secured on the rod and a spring 19 is interposed between the collar and the bearing 12. This provides a yielding support for the crosshead 9, this being essential as the width of the shooks may vary with different pieces, or slivers or projections may be encountered.

All of the feeding rolls are secured on shafts, as indicated, and each shaft carries a sprocket gear. A chain 20 is passed over the sprockets, as shown in Fig. 1, and over the idler wheels 14, the chain being maintained in a comparatively taut condition at all times by adjusting the bearings supporting the idler wheels, this being possible as the upper edge of the table is slotted longitudinally and the bearings are secured by nuts 14a.

The shaft supporting the feed roller 7 is extended, as indicated at 22, and is connected through means of a universal joint 23 with a driving shaft 24, this being provided with a pulley 25 which may be driven from any suitable source of power through a belt or the like.

By referring to Figs. 1 and 2 it will be noted that the shook is supported by an inclined plate 26 disposed at right angles to the table 5. This plate functions as a hopper and permits the shooks to be stacked therein. The forward edge of the plate is provided with an adjustable stop plate 27. This is slotted, as shown at 28, and is secured to the plate 26 by means of bolts 29, hence permitting it to be moved upwardly or downwardly with relation to the table 25 and thereby rendering it adjustable to shooks of varying thickness.

Secured to the forward edge of the table and supported by the frame is a feeding trough generally indicated at 30. One edge of the trough consists of a vertical wall 31, while the other side of the trough consists of an inclined plate 32. This plate has a helical twist formed therein, as shown at 33, so that the plate is gradually turned from an angular position to a vertical position, as indicated at 34. In other words, the shook when delivered into the feeding trough assumes an angle of approximately 45° but as it advances through the trough it is engaged by the helical surface of the trough and gradually changes from an angular to a vertical position, and as such reaches the vertical feeding rolls B in a vertical or upright position.

Any danger of the shooks piling up or overlapping each other while in the trough is avoided by providing a series of resilient spring arms, such as shown at 35. These arms engage each piece of shook as it advances through the trough and as such maintains the shook in endwise engagement one with the other, and overlapping and piling up is thus entirely avoided.

By referring to Fig. 3 it will be noted that the feeding rolls 6 and 6a are slightly relieved for approximately one half of their circumference. This relief is not very great, but it is sufficient to increase and decrease the spacing between the rolls during each revolution, thus permitting the lowermost piece of lumber in the stack 17 to drop in between the feeding rolls by gravity when the spacing between the feeding rolls is the greatest, and to be engaged by the feeding rolls as the spacing decreases.

The feeding rolls 7 and 7a are centrally journalled and the function of the rolls 6 and 6a is thus merely that of advancing the lowermost piece of lumber a sufficient distance to cause it to be engaged by the feeding rolls 7 and 7a. Once the lumber is engaged by these rolls it is advanced in a forward direction into the feeding trough, and as such will be delivered to the feeding rolls B which in turn insure delivery to the saw C.

In actual operation the lumber or shooks to be fed to the resaw is placed in the hopper, as shown in Fig. 1 with the forward ends engaging the stop plate 27. The hand wheel 13 is then turned until the spacing between the feeding rolls is sufficient to permit the lowermost piece of lumber to drop between the same, and the end stop 27 is then adjusted to take care of the thickness of the shook, thus preventing more than one piece of shook from being fed at a time.

These two adjustments are important, as they render the machine universally applicable to shooks and lumber of varying length, thickness and width. The adjustments are furthermore simple, thus permitting rapid changes when different varieties of lumber or shooks are being fed, and slack in the chain can be taken up at all times by merely adjusting the bearings in which the idler wheels 14 are journaled.

While certain features of the present invention are more or less specifically described, I wish it understood that various changes may be resorted to within the scope of the appended claims, similarly that the materials and finishes of the several parts employed may be such as the manufacturer may decide or varying conditions or uses may demand.

Having thus described my invention, what I claim and desire to secure by Letters Patent is:

1. A shook feeding machine comprising a table, a hopper associated therewith in which shooks are adapted to be stacked, a pair of feeding rolls disposed one on each side of the table said rolls engaging opposite edges of the lowermost shook in the stack and adapted to remove the shooks one by one, a stop plate at one end of the hopper, means whereby the stop plate may be adjusted to shooks of varying thickness, a chain for driving said feeding rolls, means for adjusting the rolls, and means for adjusting the chain to compensate for slack in the chain caused by the adjustment of the rolls.

2. In a machine of the character described a frame, an angularly disposed table supported by the frame, a hopper supported by the frame and disposed substantially at right angles to the table, said hopper adapted to receive a stack of shooks, a pair of feeding rolls journalled adjacent the lower side of the table, a crosshead adjustably mounted with relation to the upper side of the table, a pair of feeding rolls journalled on said crosshead, and a common driving member whereby both pairs of feed rolls are rotated in unison.

3. In a machine of the character described a frame, an angularly disposed table supported by the frame, a hopper supported by the frame and disposed substantially at right angles to the table, said hopper adapted to receive a stack of shooks, a pair of feeding rolls journalled adjacent the lower side of the table, a crosshead adjustably mounted with relation to the upper side of the table, a pair of feeding rolls journalled on said crosshead, a common driving member whereby both pairs of feed rolls are rotated in unison, a feed trough connected with the table and adapted to receive the shooks discharged by the feeding rolls, said feeding trough having one vertical wall and one inclined wall and a helical twist in the inclined wall connecting the inclined wall with the vertical wall so as to change the position of the shook from that of an incined to a vertical position.

4. In a machine of the character described a frame, an angularly disposed table supported by the frame, a hopper supported by the frame and disposed substantially at right angles to the table, said hopper adapted to receive a stack of shooks, a pair of feeding rolls journalled adjacent the lower side of the table, a crosshead adjustably mounted with relation to the upper side of the table, a pair of feeding rolls journalled on said crosshead, a common driving member whereby both pairs of feed rolls are rotated in unison, a feed trough connected with the table and adapted to receive the shooks discharged by the feeding rolls, said feeding trough having one vertical wall and one inclined wall, a helical twist in the inclined wall connecting the inclined wall with the vertical wall so as to change the position of the shook from that of an inclined to a vertical position, and yielding members in the trough engaging the shooks and maintaining the shooks in engagement with the inclined wall, with the helical surface and with the last named vertical surface.

ELMO D. CAMPEN.